US012431658B2

(12) United States Patent
Ibarra et al.

(10) Patent No.: US 12,431,658 B2
(45) Date of Patent: Sep. 30, 2025

(54) ELECTRICAL CONNECTOR WITH FIELD SERVICEABLE SHELL ASSEMBLY

(71) Applicant: Hi Rel Connectors, Inc., Claremont, CA (US)

(72) Inventors: Saul Ibarra, Santa Ana, CA (US); Willis A. Williams, Fontana, CA (US)

(73) Assignee: Hi Rel Connectors, Inc., Claremont, CA (US)

( * ) Notice: Subject to any disclaimer, the term of this patent is extended or adjusted under 35 U.S.C. 154(b) by 0 days.

(21) Appl. No.: 18/754,046

(22) Filed: Jun. 25, 2024

(65) Prior Publication Data

US 2024/0347957 A1 Oct. 17, 2024

Related U.S. Application Data

(63) Continuation of application No. 17/543,460, filed on Dec. 6, 2021, now Pat. No. 12,040,571, which is a continuation of application No. 16/039,327, filed on Jul. 19, 2018, now Pat. No. 11,196,206.

(51) Int. Cl.
*H01R 13/44* (2006.01)
*H01R 13/641* (2006.01)

(52) U.S. Cl.
CPC .......... *H01R 13/44* (2013.01); *H01R 13/641* (2013.01)

(58) Field of Classification Search
CPC .. H01R 13/44; H01R 13/641; H01R 2201/26; H01R 13/621; H01R 24/005
See application file for complete search history.

(56) References Cited

U.S. PATENT DOCUMENTS

| | | | | |
|---|---|---|---|---|
| 2009/0137145 A1* | 5/2009 | Arts | H01R 13/748 | 439/578 |
| 2018/0202593 A1* | 7/2018 | Hudson | F16L 37/05 | |
| 2023/0411899 A1* | 12/2023 | Schneider | H01R 24/38 | |

* cited by examiner

*Primary Examiner* — Truc T Nguyen
(74) *Attorney, Agent, or Firm* — Ivan Miles Posey, Esq.

(57) ABSTRACT

A connector comprises an external mounting flange that provides a housing in which a gimbal shell assembly sits and pivots. An internal recessing shell is capable of having an electrical connection with the gimbal shell assembly, wherein when the gimble shell assembly is disengaged, no electrical connection exists between internal recessing shell and gimbal shell assembly. A center screw is capable of being torqued to disengage and reengage the gimble shell assembly.

8 Claims, 5 Drawing Sheets

ELECTRICAL CONNECTOR WITH FIELD SERVICEABLE SHELL ASSEMBLY

CROSS-REFERENCE TO RELATED APPLICATIONS

This application is a continuation patent application of U.S. patent application Ser. No. 17/543,460 titled "ELECTRICAL CONNECTOR WITH FIELD SERVICEABLE SHELL ASSEMBLY" and filed on Dec. 6, 2021, which is a continuation of U.S. patent application Ser. No. 16/039,327 titled "ELECTRICAL CONNECTOR WITH FIELD SERVICEABLE SHELL ASSEMBLY" and filed Jul. 19, 2018, the contents of which are incorporated herein in their entirety.

FIELD OF THE INVENTION

Disclosed and described is an electrical connector with field serviceable shell assembly. Specifically, electrical connector includes a missile umbilical field replaceable design.

BACKGROUND

An electrical connector assembly is comprised of two generally cylindrical connector shells (e.g., plug and receptacle shells), each connector shell retaining a plurality of electrical contacts therewithin with the electrical contacts in one connector shell being mateable with the electrical contacts in the other connector shell when the connector shells are coupled together by a coupling member. The coupling member is typically mounted to the plug shell by a retaining ring to rotatably captivate a radial flange of the coupling member against an annular shoulder of the plug shell.

Connectors used by U.S. Department of Defense were originally developed in the 1930s for severe aeronautical and tactical service applications, and the Type "AN" (Army-Navy) series set the standard for modern military circular connectors. These connectors, and their evolutionary derivatives, are often called Military Standard, "MIL-STD", or (informally) "MIL-SPEC" or sometimes "MS" connectors. They are now used in aerospace, industrial, marine, and even automotive commercial applications.

Connectors usually consist of (i) a mating pair (plug and receptacle) each equipped with male (pin) or female (socket) contacts; note that at least one of the connector halves, or its contacts, should be floating to minimize mechanical stresses. FIG. 1 is an illustration of a prior art MIL-DTL-38999 circular connector (receptacle 25 and plug 27).

Electrical connector contacts are typically Beryllium copper (BeCu) or Phosphor bronze which is then plated with gold or some other non-corrosive, highly-conductive metal. The contacts are contained by a dielectric insulator (typically a layered construct of various polymers or glass depending upon connector series and manufacturer, and often known as the insert) and are housed in an enclosure (i.e., shell), that is often diecast aluminium and plated or anodized for corrosion protection. Steel and titanium are also used. The contacts may be captive or removable using a special tool. The electrical connection into the system at the contact terminal is either a soldered or crimped connection. The seal between the shell and insulator may be moisture resistant or a hermetic seal. The inserts in each connector half must be oriented for correct mating, and the shell or insert usually contains a keying feature to prevent mis-mating that could damage the connector or result in an electrical problem. Cable clamps and other mounting hardware may be provided, and the mated halves are usually secured by a locking mechanism to prevent disengagements.

Fiber optic connectors are typically plugs or so-called male connectors with a protruding ferrule that holds the fibers and aligns two fibers for mating. They use a mating adapter to mate the two connectors that fits the securing mechanism of the connectors (bayonet, screw-on or snap-in.) A primary specification issue for fiber optic connectors is insertion loss, i.e., the amount of light lost in the connection expressed in dB Connectors (Electrical) Described by Military Specifications MIL-DTL-5015 (formerly MIL-C-5015) describes electrical circular connectors with solder or removable crimp contacts (both front and rear release). These connectors are for use in electronic, electrical power, and control circuits and are used in large numbers for defense, civil, and industrial applications due to their versatility, reliability, and ease of supply. These connectors are rated for operation within a temperature range of −55° C. (−67° F.) to either 125° C. (257° F.), 175° C. (347° F.), or 200° C. (392° F.) depending upon the class of the connector. The insert arrangements are provided in MIL-STD-1651.

MIL-DTL-12520 (formerly MIL-C-12520) describes the general requirements for a series of centerlock screw coupling, waterproof, polarized, multicontact connectors and accessories for inter-connection of power and control circuits on electronic equipment that are intended primarily for ground or shore use. Resistant to contamination of dust, dirt, and water, these harsh environment connectors also provide the resistance to shock and vibration via the center-locking screw, which is easily secured by turning the mechanized fold-down, wing-blade handle. The insert arrangements are provided in the specification.

MIL-DTL-22992 (formerly MIL-C-22992) describes multi-contact, heavy duty, quick disconnect, waterproof, electrical plug and receptacle connectors and associated accessories for electronic and electrical power and control circuits. The connectors are rated for −55 degrees to +125 degrees Celsius. These connectors are intended for use as follows: (i) Class C connectors are intended for external interconnection use on vans, shelters, trailers, buildings and heavy duty applications; (ii) Class J connectors are used in Class C applications where a wire support grommet is necessary; (iii) Class L connectors are intended for power connections from 40 to 200 amperes where heavy duty, waterproof and are quenching ability are required; and (iv) Class R connectors are used as general purpose heavy-duty connectors where pressurization and are quenching ability are not required. The insert arrangements are provided in MIL-STD-1651, with additional arrangement for high-current applications provided in the associated MS sheets.

MIL-DTL-24308 (formerly MIL-C-24308 and MIL-PRF-24308) describes non-environmental, polarized shell, miniature, rack and panel connectors having pin and socket, crimp (removable), solder (non-removable), or insulation displacement (non-removable) contacts with rigid or float mounting, designed for −55° C. to +125° C. operating temperature range. Also called D-subminiature or D-sub connectors, they are designed primarily for applications where space and weight are of major importance while accommodating a large number of circuits in proportion to their size which makes them well suited for aircraft, missiles and related ground support systems. Although MIL-C-24308 connectors are primarily designed for rack and panel applications, these connectors can also be adapted for other cabling requirements by addition of accessories and integral clamps. These connectors are intended for general military use as follows: (i) Classes G and N connectors are intended for use in applications where the operating temperature range of −55° to +125° C. is experienced; Class N connectors are used in applications where the presence of residual magnetism must be held to low levels; (iii) Class H receptacles are used where atmospheric pressures must be contained across the wall or panels on which the connectors are mounted; and (iv) Classes D, K, and M connectors are for high-reliability space applications. The insert arrangements are provided in the specification.

MIL-DTL-26482 (formerly MIL-C-26482) describes the general requirements for two series of environment resisting, quick disconnect, miniature, circular electrical connectors (and accessories). Each series includes hermetic receptacles. The two series of connectors are intermateable when using power contacts and are not intermateable when using shielded contacts. The various connector classes and types include: (i) Classes E, F, J, and P connectors are used in environment-resisting applications with an operating temperature range of −55-to-125 degree Celsius (−67-to-257 degree F.); and (ii) Class H receptacles are used applications wherein pressures must be contained across the walls or panels on which the connector is mounted. Many applications for this connector deviate from the official military specification; for an example, a robust metallic shell based on the MIL-DTL-26482 design supports the use of Ethernet 10/100/1000BaseT data communications networks in harsh environments while maintaining compatibility with IEC 60603-7-7 requirements. MIL-DTL-26482 include two series of circular connectors: Series I includes MS3110, MS3111, MS3112, MS3114 and MS3116 connectors, while Series II includes MS3470, MS3474, MS3475 and MS3476 connectors. The insert arrangements are provided in MIL-STD-1669.

MIL-DTL-32139 describes nanominiature connectors terminated on printed circuit boards or attached to cable assemblies. These connector's contacts are densely packed with 0.64 mm (0.025 inch) spacing between contact centers in the same row. These connectors are intended for interconnections on printed wiring board (PWB), PWB-to-cable, cable-to-panel, or cable-to-cable on miniaturized equipment sub-assemblies with low power requirements. The connectors are militarily unique because of requirements to operate satisfactorily under sinusoidal vibrations of 10-to-2000 Hz at up to 20 g's, to withstand 48-hours of salt spray without exposure of base metals affecting performance or causing pitting/porosity of the finish; to withstand 100 g's of shock with no electrical discontinuity; and to operate at temperatures of −55 to +125 degrees Celsius. The insert arrangements are provided in the associated specification sheets.

MIL-DTL-38999 (formerly MIL-C-38999) describes four series of miniature, high density, bayonet, threaded, or breech coupling, circular, environment resistant, electrical connectors using removable crimp or fixed solder contacts, and are capable of operation within a temperature range of −65 to +200 degrees Celsius. The connectors are intended for use as follows: (i) Series I connectors are used where a quick disconnect coupling system is required for blind mating or other mating problem areas, and these connectors provide high-vibration characteristics and are suitable for severe wind and moisture problem (SWAMP) areas with proper connector accessories; (ii) Series II connectors are used where the connector is not subjected to high vibration or SWAMP areas and where space or weight is at a premium due to their lower profile; (iii) Series III connectors are suitable for blind mating areas, and provide high-vibration characteristics at elevated temperature and are suitable for SWAMP areas with the proper connector accessories; and (iv) Series IV connectors are used where a quick disconnect coupling system is required for blind mating or other mating problem areas, and these connectors provide high-vibration characteristics and are suitable for SWAMP areas with the proper connector accessories. These connectors are lightweight, and are all scoop proof with the exception of series II which are non-scoop-proof. The insert arrangements are provided in MIL-STD-1560.

MIL-DTL-83513, (formerly MIL-C-83513) describes polarized shell, micro-miniature, rectangular electrical connectors with solder or non-removable crimp contacts. The connector meets demanding applications and harsh environments and it is mechanically robust and durable, with low contact resistance, high current capability and high dielectric strength, and it has an excellent resistance to shock and vibration, while offering a high pin density, small size and lightweight body. Often referred to as a Micro-D connector system, the connector is suited to a multitude of systems where weight, miniaturization or signal transmission integrity are paramount, such as missiles and their guidance systems, aerospace avionics, radars, shoulder-launched weapon systems, advanced soldier technology systems, military Global Positioning Systems, satellites, medical devices and down-hole drilling tools. The insert arrangements are provided in the associated specification sheets.

MIL-DTL-83527, (formerly DoD-C-83527 and MIL-C-83527) describes the requirements, quality assurance criteria and test procedures for the design and fabrication of an environment resisting low insertion force, multiple insert rectangular connector used in the electrical/electronic bay areas of military aircraft. The connector provides the electrical interface between the avionics equipment and the equipment rack or tray. These connectors are military unique because they must operate satisfactory at high altitude 50,000 feet (15.2 km), endure 500 hours of salt spray, vibration testing (functional and endurance), shock (30 g's), and temperatures from −65 to +125° C. These connectors must be used in conjunction with DoD-STD-1842 which describes the insert arrangements for use with MIL-DTL-83527 Rack-to-Panel connectors. The insert arrangements are provided in DOD-STD-1842.

MIL-DTL-83538, (formerly MIL-C-83538) describes connectors and accessories, electrical, circular, umbilical. The connector assembly provides the necessary connections required to meet a MIL-STD-1760, Class I electrical interface between stores and their associated launchers using a "blind mating" mechanism. The connector assembly consists of a receptacle installed on the launcher, a receptacle installed on the store, and a buffer plug installed between the two receptacles. This specification also includes the required mounting adapters and nut, accessory adapter, cable bushing, and protective covers. This connector assembly provides the transfer of MIL-STD-1760 interface class I electrical signals and power between an aircraft (or ground vehicle) mounted launcher and an associated store. This connector is military unique because it is intended to be used on rail and eject launchers where engagement/disengagement of the launcher receptacle (with attached buffer plug) to the store receptacle will be via a blindmate mechanical mechanism; whereas no known commercially equivalent substitute is available. The insert arrangement is 25-20 of MIL-STD-1560.

Connectors (Fiber Optic) Described by Military Specifications

MIL-C-83522 is a military specification describing the characteristics, performance and testing criteria for single terminus fiber-optic connectors. The specification covers families of both bulkhead and cable termination configurations. The connectors must have consistent optical performance, and must be supplied under a MIL-STD-790 reliability assurance program. Statistical process control (SPC) techniques are required in the manufacturing process to minimize variation in the final product. These connectors are intended for use in fixed plant locations, tactical, aerospace and spaceflight avionics, shipboard, ground vehicle, and other specialized military applications.

MIL-DTL-83526, (formerly MIL-C-83526) is a military specification describing the characteristics, performance and testing criteria for an environmental resistant, hermaphroditic interface, fiber-optic circular connector. The connectors covered have a consistent and predictable optical performance using low loss optical fiber cables in military, ground based, fiber-optic data transmission systems, and are sufficiently rugged to withstand military field applications. This specification includes expanded-beam fiber-optic connectors.

Alternative Connectors (Electrical and Fiber Optic) for Military Applications

Selection of connector alternatives that are not defined by military specifications (MIL-C or MIL-DTL) can use either designated performance specifications (MIL-PRF) issued by the Department of Defense (DoD) or by using Commercial Item Descriptions (CID) issued by the General Services Administration (GSA) pursuant to DoD 4120.24-M, or by using standards developed by nationally and internationally recognized technical, professional, and industry associations and societies, collectively referred to as "Non-Government Standards Bodies" (NGSBs).

Performance Specifications are connector specifications that are intended to describe product that is essentially the same quality previously defined by familiar military specifications and built under the DoD's Qualified Manufacturer List (QML) product/supplier controlled system rather than the more-stringent Qualified Product Line (QPL) system.

MIL-PRF-29504 (formerly MIL-T-29504) is a performance specification describing the general requirements for removable crimp and epoxy type fiber-optic termini for use in connectors and similar components. These termini are unique for military applications and must operate satisfactorily in systems under demanding conditions of 10 g's vibration (10 g3 s), shock (over 1000 g's), and temperature excursions (from −40 degrees C. to +70 degrees C.).

MIL-PRF-28876 (formerly MIL-C-28876) is a performance specification describing for circular, plug and receptacle style, multiple removable termini, fiber-optic connectors that are for DoD applications and that are compatible with multiple transmission element cables. This specification describes a family of general purpose, interconnection hardware providing a variety of compatible optical coupling arrangements, and includes connector shells, connector inserts, connector insert retention nuts, connector backshells, and connector dust caps. These connectors are unique for military applications and must operate satisfactorily in systems under demanding conditions of 10 g's vibration (10 g's), shock (over 1000 g's), and temperature excursions (from −40 degrees C. to +70 degrees C.).

MIL-PRF-39012 (formerly MIL-C-39012) is a performance specification describing the general requirements and tests for Radio Frequency (RF) connectors used with flexible RF cables and certain other types of coaxial transmission lines.

MIL-PRF-31031 (formerly MIL-C-31031) is a performance specification describing the general requirements and tests for RF connectors used with flexible cables and certain other types of coaxial transmission lines.

MIL-PRF-49142 (formerly MIL-C-49142) is a performance specification describing the general requirements and tests for RF, triaxial, connectors. These connectors and fittings are intended for use with biaxial cable and can be used for RF applications when more shielding is required, and they can also be used for serial digital transfer.

MIL-PRF-64266 is a performance specification describing the performance requirements for circular, plug and receptacle style, multiple removable genderless termini, fiber optic connectors for DoD applications—including aerospace and maritime—and that are compatible with multiple transmission element cables. These fiber optic connectors cover a family of general purpose, interconnection hardware providing a variety of compatible optical coupling arrangements, including connector shells, connector inserts, connector backshells, connector backshell accessories, and connector dust caps. All connector styles are designed to assure proper orientation of the mating halves prior to mating, and provide engagement between mated shells prior to terminus engagement and have the termini so located as to be protected from handling damage. The plug and receptacle styles permit straight, wall (panel) mounted, jamnut mounted, right angle and other connector configurations.

Current Need to Service Aircraft Connectors Below Deck

Aircraft carrier operations in particularly present many unique needs and challenges, including in the area of ordinance connectors. Specifically, current connectors require removing screws or bolts from the connector during many servicing operations. Regulations may prevent this type of service being performed on deck of the carrier for good reason. Recently, a Marine Corps AV-8B Harrier's cross-country training flight on May 6, 2016, was abruptly cut short when the aircraft suffered catastrophic engine failure and crashed in the water off Wilmington, North Carolina, shortly after take-off. According to a command investigation, the disaster was likely caused by debris damaging the engine—and the suspected culprit was a screw fastener with a 5/16ths-inch hexagonal bolt head that was ingested by the engine, most likely on an aircraft carrier.

However, taking the time to move an aircraft below deck to service connectors or ordinance involving connectors can take much time, and may add to safety concerns. It would be much more preferable in terms of time and safety to be able to service the electronical connector on deck without having to move the aircraft or ordinance below deck.

Thus there is a need for a connector having an electrical connector that does not involve removing loose screws or bolts that overcomes the above disadvantages.

SUMMARY

In accord with a preferred embodiment of the invention, a connector, comprises: an external mounting flange that provides a housing in which a gimbal shell assembly sits and pivots; an internal recessing shell capable of having an electrical connection with the gimbal shell assembly, wherein when the gimble shell assembly is disengaged, no electrical connection exists between internal recessing shell and gimbal shell assembly; and a center screw that is capable of being torqued to disengage the gimble shell assembly.

DETAILED DESCRIPTION OF THE PREFERRED EMBODIMENTS

Figure 1:
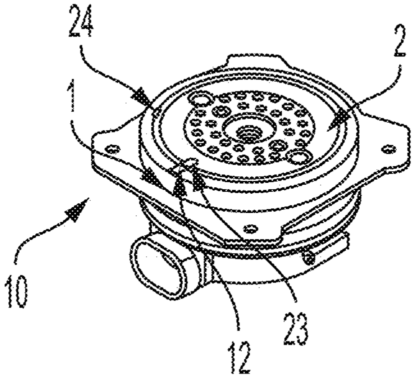
FIG. 1 is a right-front perspective view of the connector according to one embodiment.

For the purpose of illustrating the invention, there is shown in the accompanying drawings several embodiments of the invention. However, it should be understood by those of ordinary skill in the art that the invention is not limited to the precise arrangements and instrumentalities shown therein and described below.

The connector in accordance with preferred embodiments of the present invention is illustrated in FIGS. 1-10, wherein like reference numerals are used throughout to designate like elements.

With reference to FIG. 1 a right-front perspective view of the connector 10 according to one embodiment is shown. An external mounting flange 1 provides a way to assemble an umbilical assembly. The external mounting flange 1 provides a housing in which a gimbal shell assembly 2 sits and pivots.

Figure 2:
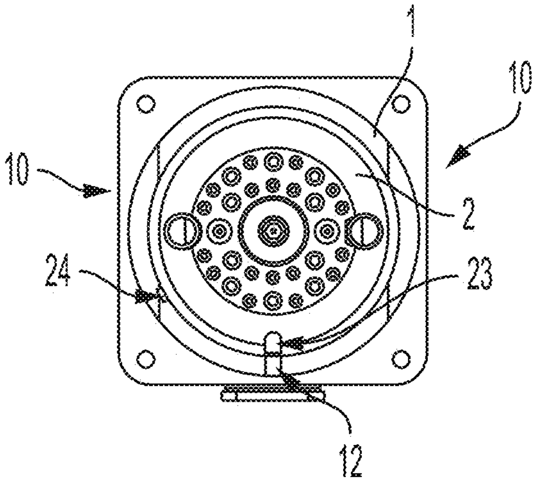
FIG. 2 is an elevational view of the connector with the shell assembly in the engaged configuration during use according to the embodiment of FIG. 1.

With reference to FIG. 2, an elevational view of the connector 10 with the gimbal shell or shell assembly 2 in the engaged configuration during use is shown. During use, the electrical connection is achieved between the internal recessing shell (5 in FIG. 4) and gimbal shell or shell assembly 2. In FIG. 2, the gimbal shell or shell assembly 2 is turned in the locked position so it is not removable.

Figure 3:
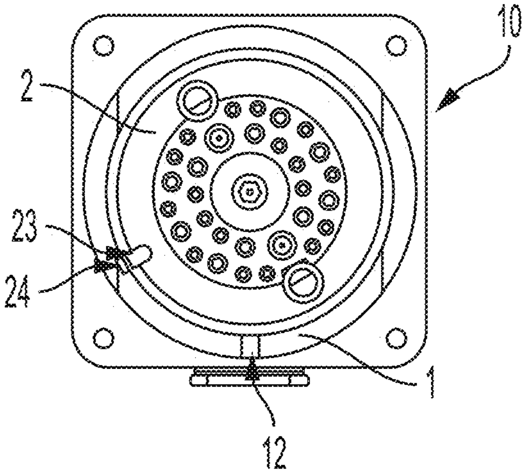
FIG. 3 is an elevational view of the connector with the shell assembly in the disengaged configuration when not in use according to the embodiment of FIGS. 1-2.

With reference to FIG. 3, an elevational view of the connector 10 with the shell assembly 2 in the disengaged configuration when not in use is shown. When the shell assembly 2 is disengaged, no electrical connection exists between internal recessing shell 5 and gimbal shell assembly 2. The shell assembly 2 can be removed or replaced installed and is ready to be turned back to engage with the spring captivation nut shell (4 in FIG. 4).

Figure 4:
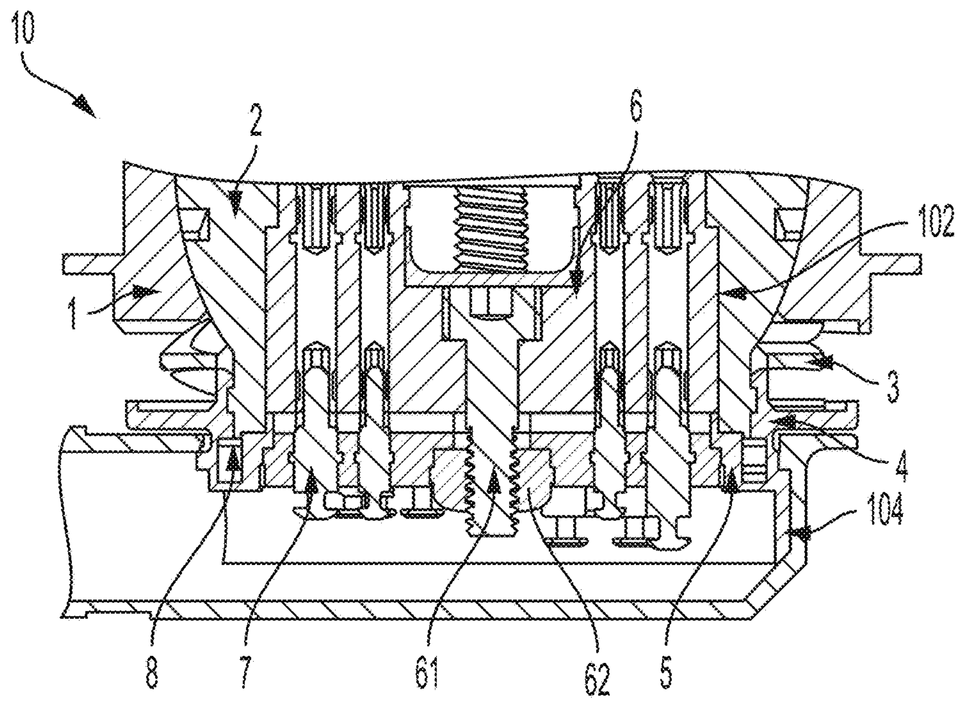
FIG. 4 is a right cross-sectional view of the connector according to the embodiment of FIGS. 1-3.

With reference to FIG. 4, a right cross-sectional view of the connector is shown. The external mounting flange 1 provides a method to attach the umbilical assembly for electrical connection between aircraft and ordinance for example. The external mounting flange 1 provides a housing in which gimbal shell assembly 2 sits and pivots.

The removable gimbal shell assembly 2 houses the external dielectric with electrical contacts 7. The shell assembly 2 provides the gimbal as well the engagement face.

The spring captivation nut shell 4 acts as lower support on the out wave spring 3 and also acts as an engagement nut for the replaceable gimbal shell or shell assembly 2. The spring captivation nut shell 4, in one embodiment, can be the sole engagement point between the replaceable unit and the lower shell, internal recessing shell 5, and center nut 62. An internal recessing shell 5 houses internal dielectric with electrical contacts 7. When the center screw 61 is torqued in counter clockwise direction, the internal gimbal shell or shell assembly 2 recesses and disengages the electrical contacts 7.

The wave spring 3 ensures the assembly sits flush after gimbal action. It provides constant load in all directions. A center captivating screw system or actuation system 6 provides an actuation system 6 in which the gimbal shell or shell 2 disengages. The actuation system 6 also pulls the assemblies together. The actuation system 6 may include a center screw 61 and a center nut 62.

The electrical contacts 7 provide an electrical path for the signals and power to and from the aircraft and ordinance through pins 72 in sockets.

An internal wave spring 8 prevents the internal recessing shell 5 from engaging with the upper shell assembly 102. The internal wave spring 8 prevents the lower shell 5 from engaging. The lower shell is the internal shell 5 that disengages by recessing. The internal wave spring 8 also aids in disengaging the lower contact assembly to overcome contact strength.

An interfacial seal 9 provides an environmental seal between each contact when fully mated.

Figure 5:
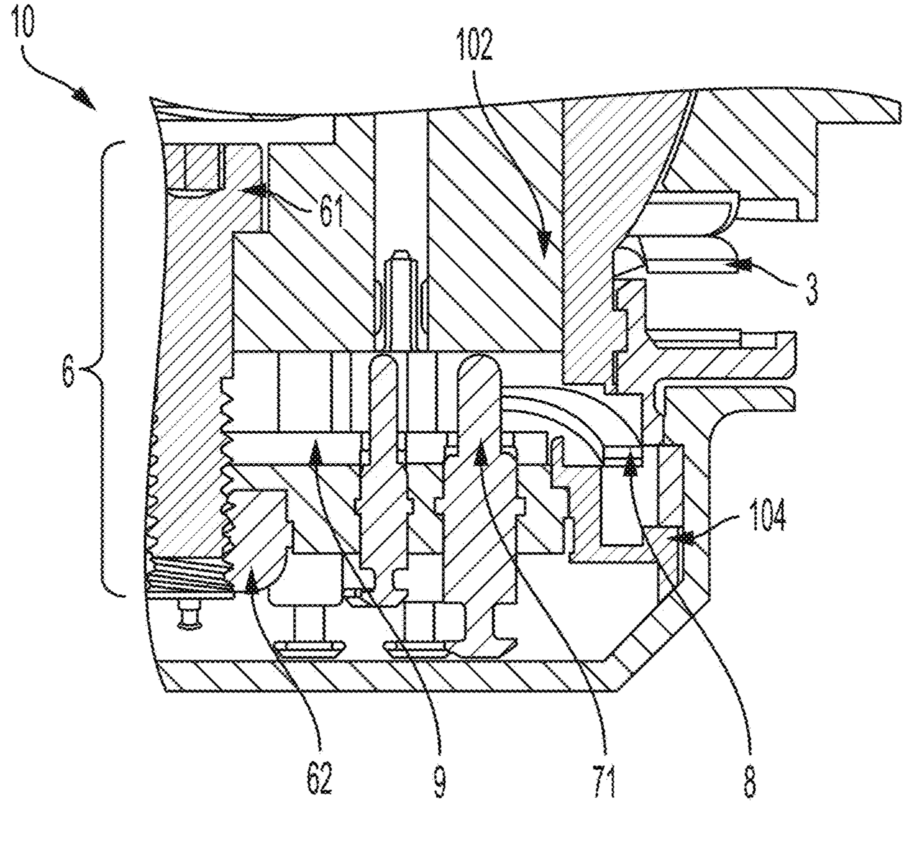
FIG. 5 is a portion of the cross-section of the connector with the center screw partially turned for disengagement according to the embodiments of FIGS. 1-4.

With reference to FIG. 5, a portion of the cross-section of the connector 10 with the center screw 61 partially turned for disengagement is shown. As shown in FIG. 5.

Figure 6:
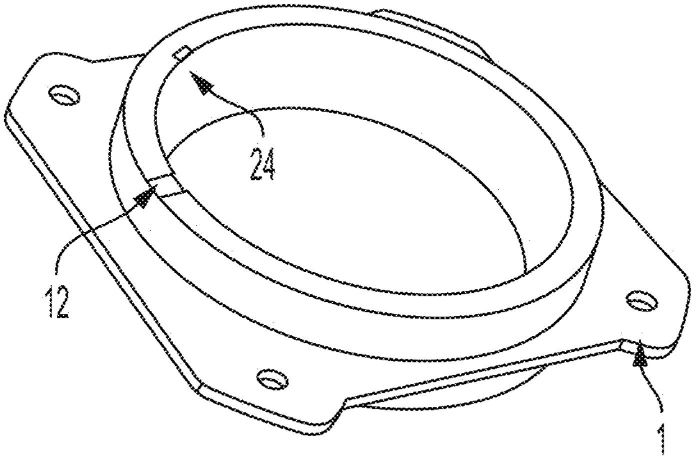
FIG. 6 is a right perspective view of the exertional mounting flange shown in detail according to the embodiments of FIGS. 1-5.

With reference to FIG. 6, a right perspective view of the external mounting flange 1 is shown in detail. A alignment key 23 aligns with the flange missile forward indicator 12 when in the closed position. As the center screw 61 is turned, and the shell or gimbal shell 2 is disengaged and rotated, space develops between the upper shell assembly 102 and lower contact assembly 5. The flange missile forward indicator 12 is turned away from the alignment key 23, which normally provides a visual indication of contact engagement when not being disengaged. A disengagement indicator 24 is a visual representation for removal or insertion of replaceable shell assembly 1 that aligns the shell or gimbal shell 2 for reassembly of the shell or gimbal shell 2. The replaceable shell assembly serves as the shell or gimbal shell 2. A flange is used for mounting of the full assembly or the full connector.

Figure 7:
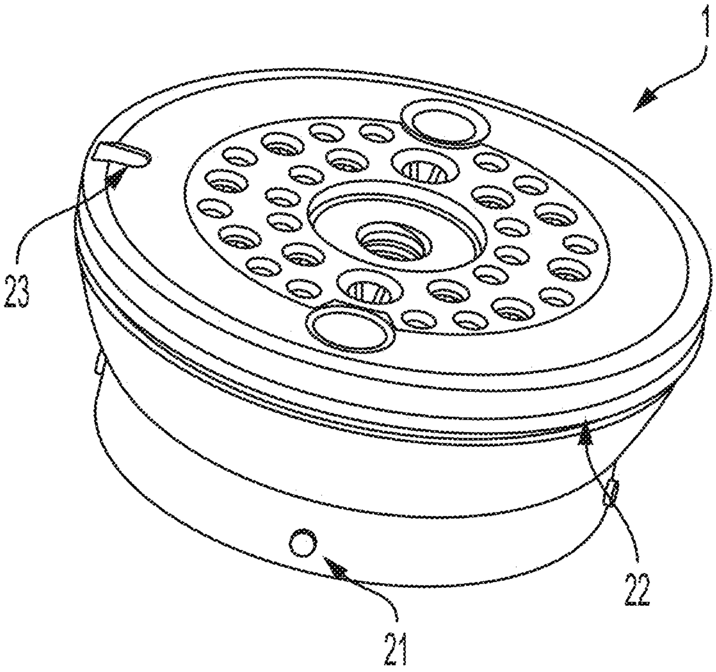
FIG. 7 is a right perspective view of the gimble shell assembly according to the embodiments of FIGS. 1-6.

With reference to FIG. 7, a right perspective view of the gimbal shell or shell assembly 2 is shown. A bayonet 21 provides engagement between replaceable shell 1 and spring captivation nut shell 4. An EMI O-ring 22 provides environmental protection as well as an electrical connection between the flange 1 and gimbal shell or shell 2.

Figure 8:
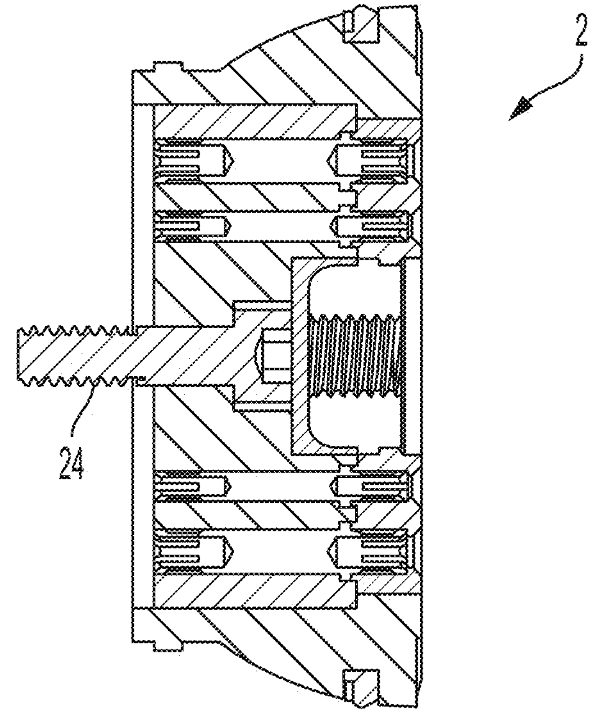
FIG. 8 is a cross sectional view of the gimble shell assembly.

With reference to FIG. 8, a cross sectional view of the gimble shell assembly 2 is shown. The center screw 61 is illustrated which protrudes from the bottom of the shell assembly 2.

Figure 9:
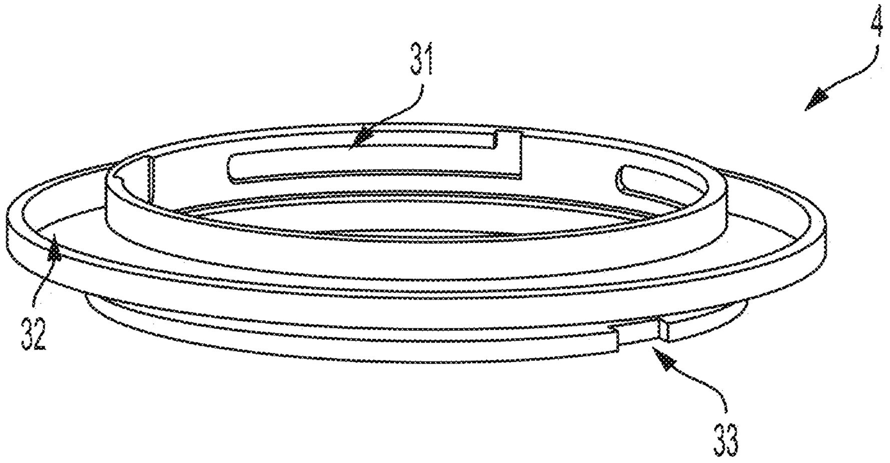
FIG. 9 is a right perspective view of the spring captivation nut shell according to the embodiment of FIGS. 1-8.

With reference to FIG. 9, a right perspective view of the spring captivation nut shell 4 is shown. Bayonet grooves 31 comprise grooves in which gimbal shell bayonets 21 slide to assemble the replaceable unit to the rest of the assembly. A spring shelf 32 supports the outer wave spring (3 in FIG. 4). An alignment groove 33 aligns the spring captivation nut shell 4 with bottom assembly and allows all bayonet grooves 31 to remain aligned with flange forward direction indicator 12.

Figure 10:
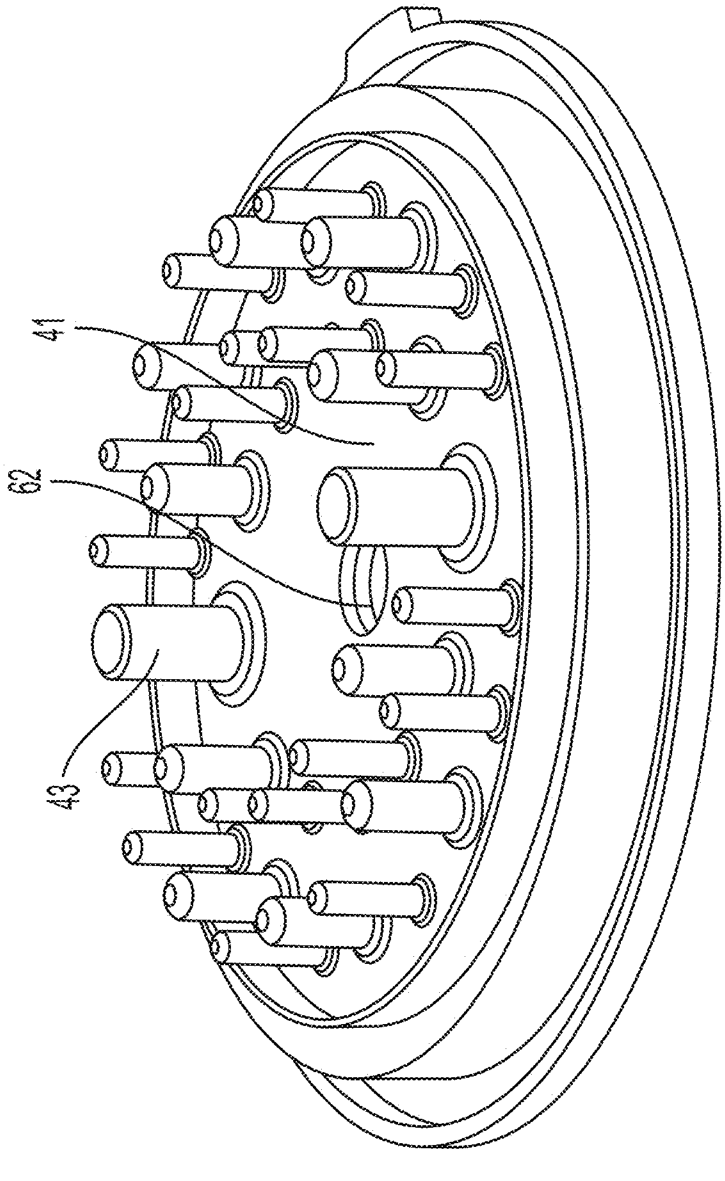
FIG. 10 is a right perspective view of the internal recessing shell according to the embodiments of FIGS. 1-9.

With reference to FIG. 10, a right perspective view of the internal recessing shell 5 is shown. The center nut 62 is the threaded member upon which the center screw 61 acts upon. When the center screw 61 is torqued it creates a downward force which disengages and lowers the internal recessing shell 5. The contact insert assembly 41 which also serves as the insulator and contact assembly, provides electrical path for the contacts 7 and provides contact alignment in accordance with insert arrangement dimensions. The contact alignment keys 43 provides alignment of the contacts 7 and shell 2 with the internal recessing shell 5. This key 7 also prevents the internal recessing shell 5 from turning out of alignment. The spring groove 44 is a surface that holds internal wave spring 8. The internal wave spring 8 prevents lower internal recessing assembly 4 from mating to the replaceable shell until it is fully engaged with the wave spring 8.

Once the full connector assembly is installed in its final state within the customer assembly, the connector is now ready for use. In order to replace the gimbal assembly 2 the operator must first torque the center screw 61 counter clockwise to disengage the internal recessing shell 5. This will separate the contacts and disengage all electrical contact paths. Once the internal recessing shell 5 can no longer move further down, the gimbal assembly 2 can be disengaged by turning it clockwise 45 degrees so that it matches the configuration of FIG. 3 with the flange missile forward indicator 12 and the alignment key 23 at 45 degrees of offset. Once the alignment key 23 is aligned with the disengagement indicator 24, the bayonets 21 on the gimbal shell 2 assembly will slide out of the spring captivation bayonet grooves 31 releasing it from the rest of the assembly.

To re-install gimbal shell assembly 2, the shell is placed with the flight forward key aligned with the disengagement notch 24 on the flange shell 1. Once the gimbal shell 2 is sitting in the flange 1, the center screw 61 is slightly torqued to grab the center nut on the internal recessing shell 5. Once the center screw 61 has grabbed, the bottom assembly as a whole will lift towards the gimbal shell 2 compressing the outer wave spring 3. The internal wave spring 8 shall ensure that the spring captivation shell 4 rises and the bayonets 21 engage with the bayonet groove. Once the bayonets 21 have been installed, the gimbal shell 2 can be turned 45 degrees counter clockwise to finish the assembly. Once the flight forward identifications 12 and 24 have lined up as in FIG. 2, the center screw 62 can be torqued clockwise to engage the electrical contacts. The torque applied on the center screw 61 will allow the internal recessing shell 5 to move upward, compressing the internal wave spring 8, and then the pins begin inserting into the sockets on the replaceable shell.

The various embodiments described above are provided by way of illustration only and should not be construed to limit the invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed is:

1. A connector, comprising:

an external mounting flange that provides a housing in which a gimbal shell assembly sits and pivots;

an internal recessing shell capable of having an electrical connection with the gimbal shell assembly, wherein when the gimbal shell assembly is disengaged, no electrical connection exists between the internal recessing shell and gimbal shell assembly;

a center screw that is torqued to disengage the gimbal shell assembly; and an O-ring to provide environmental protection as well as an electrical connection between the flange and gimbal shell.

2. The connector of claim 1, wherein the gimbal shell assembly houses electrical contacts.

3. The connector of claim 1, wherein the electrical contacts provide an electrical path for signals and power to and from an aircraft and ordinance.

4. The connector of claim 1, further comprising a wave spring capable of providing a load as the center screw is torqued in a first direction of rotation, the gimbal shell assembly is pulled to a position of engagement, wherein the wave spring is further capable of providing a load so that, as the center screw is torqued in a second direction of rotation, the gimbal shell assembly is pushed to a position of disengagement.

5. The connector of claim 1, wherein the gimbal assembly rotates to an angle x after the center screw is torqued in the second direction of rotation to disengage the gimbal assembly.

6. The connector of claim 5, further comprising a visual indicator that is aligned when the gimbal shell assembly is rotated to an angle x.

7. The connector of claim 6, further comprising a spring captivation nut shell.

8. The connector of claim 1, wherein the spring captivation nut shell comprises bayonet grooves in which bayonets on the gimbal shell slide to engage and disengage the gimbal shell assembly.

* * * * *